United States Patent [19]

Johnson

[11] Patent Number: 5,022,421
[45] Date of Patent: Jun. 11, 1991

[54] FLUID CONNECTION METHOD AND ASSEMBLY

[76] Inventor: Dwight N. Johnson, 6327 Chorlito Dr., Carlsbad, Calif. 92008

[21] Appl. No.: 471,229

[22] Filed: Jan. 26, 1990

[51] Int. Cl.$^5$ .................... F16K 43/00; F16K 51/00
[52] U.S. Cl. ..................... 137/15; 137/318; 29/33 K; 29/33 T; 29/432; 285/197; 408/87
[58] Field of Search .......... 137/15, 318; 119/725, 119/75, 76; 239/272, 542, 547; 285/197, 198, 199; 29/33 K, 33 T, 432, 525, 798; 408/87; 222/81, 83, 83.5; 72/70, 71, 325

[56] References Cited

U.S. PATENT DOCUMENTS

| | | | |
|---|---|---|---|
| 2,660,192 | 11/1953 | Hunter | 137/318 |
| 3,277,683 | 10/1966 | Knoblock | 137/318 |
| 3,418,977 | 12/1968 | Godshalk | 119/72.5 |
| 3,495,615 | 2/1970 | Ehrens et al. | 137/318 |
| 3,554,217 | 1/1971 | Ehrens et al. | 137/318 |
| 3,756,261 | 9/1973 | Minchhoff | 137/318 |
| 3,815,624 | 6/1974 | Mullins | 137/318 |
| 3,891,150 | 6/1975 | Hoff et al. | 239/272 |
| 3,954,223 | 5/1976 | Winchman et al. | 137/218 |
| 3,995,655 | 12/1976 | Sands | 137/318 |
| 4,029,118 | 6/1977 | Merideth | 137/318 |
| 4,524,724 | 6/1985 | Steudler Jr. | 119/72.5 |
| 4,790,264 | 12/1988 | Lack et al. | 119/72.5 |
| 4,809,735 | 3/1987 | Volgstadt et al. | 137/318 |

Primary Examiner—George L. Walton
Attorney, Agent, or Firm—Mason, Kolehmainen, Rathburn & Wyss

[57] ABSTRACT

A fluid connection is made to a conduit with a fluid connector by piercing a wall of the conduit. The connector includes a hollow nose portion. The connector is mounted on a tool having a punch pin extending through and beyond the nose portion. The wall is pierced by a point on the punch pin, and the hole is enlarged by forcing the nose portion through the wall while the punch pin supports the wall of the nose portion. A fluid tight seal is formed between the nose portion and a collar of deformed wall material.

11 Claims, 3 Drawing Sheets

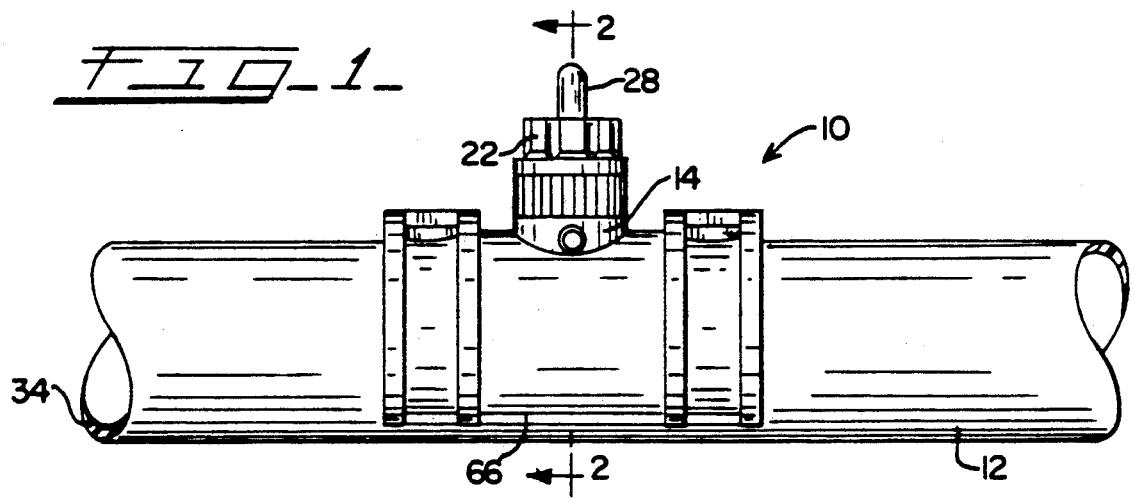
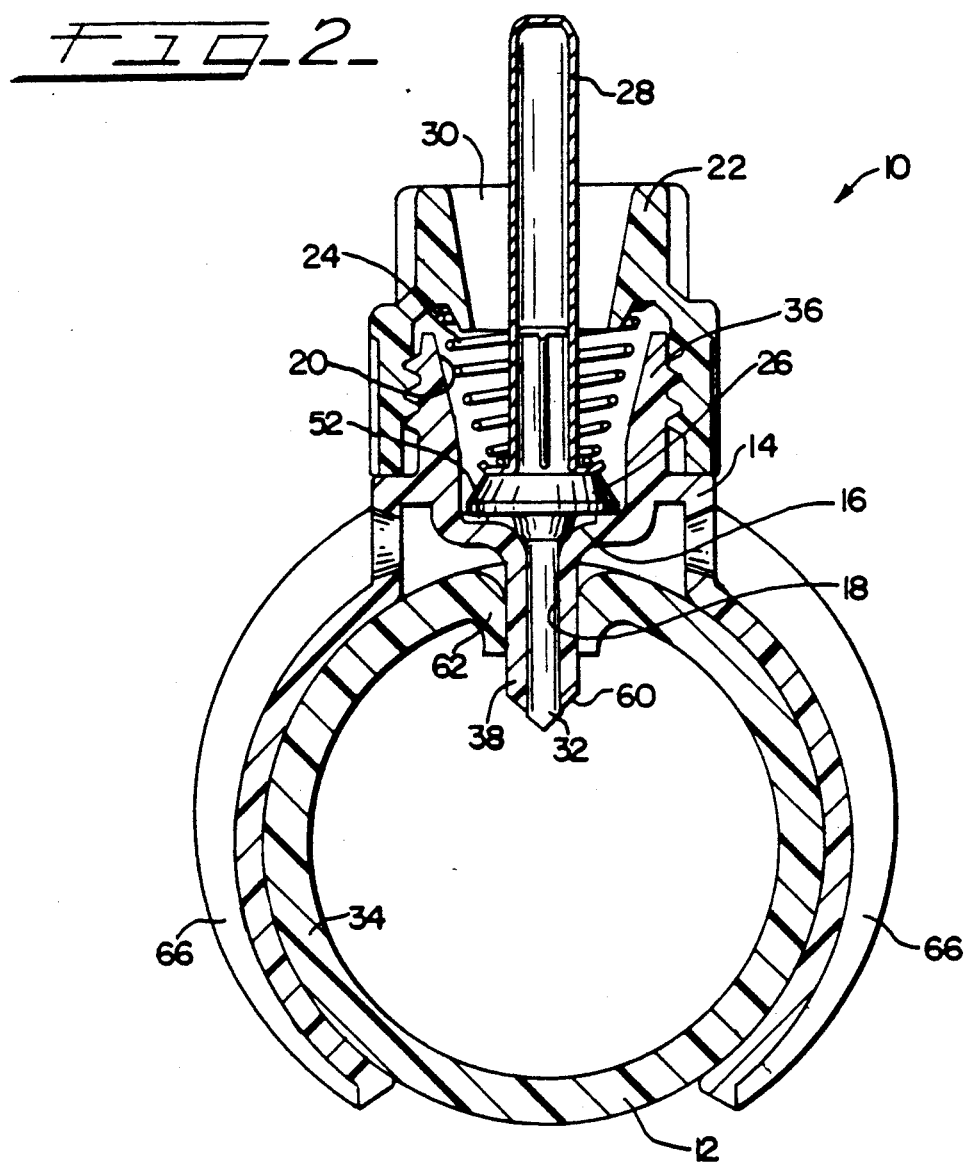

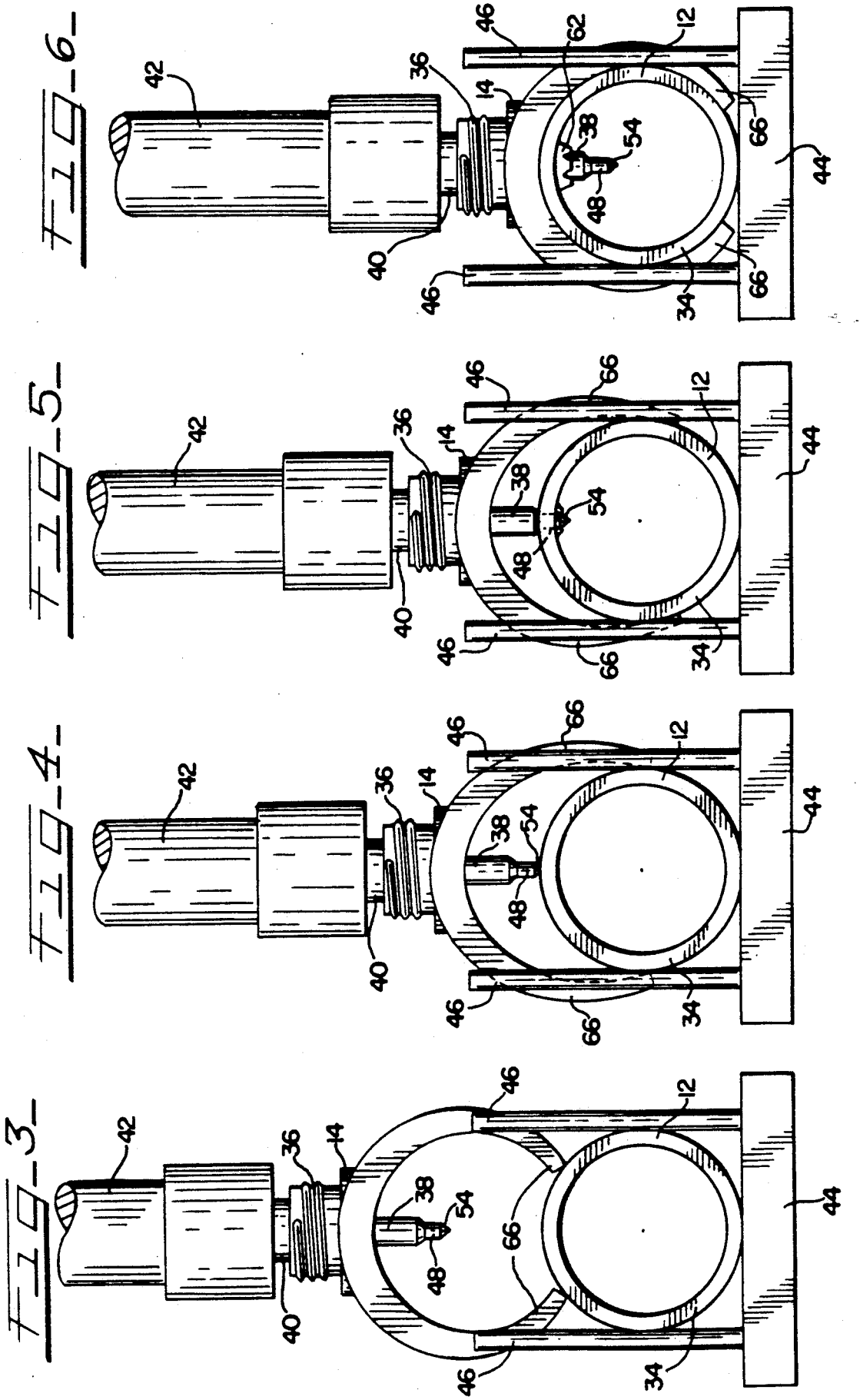

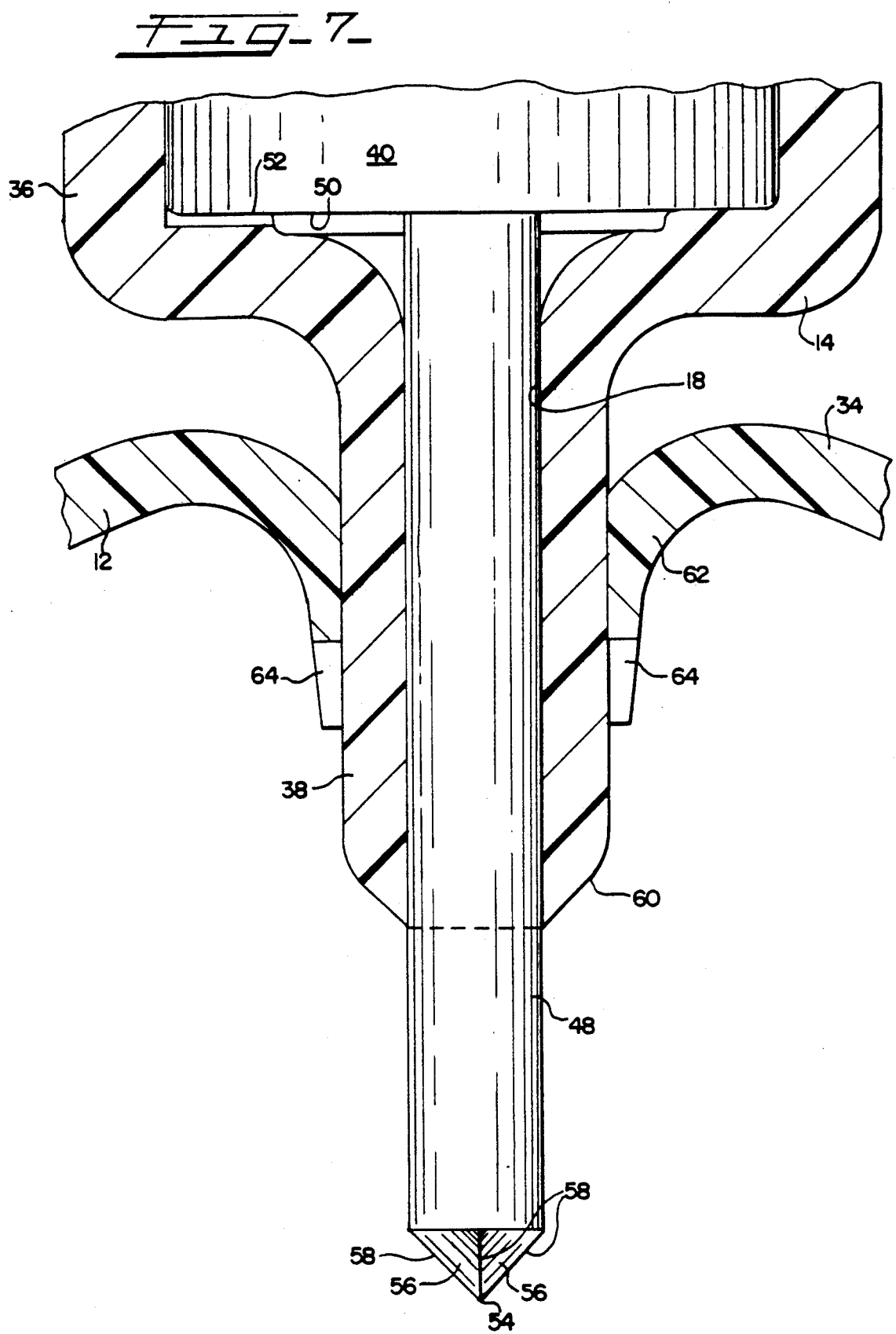

FLUID CONNECTION METHOD AND ASSEMBLY

FIELD OF THE INVENTION

The present invention relates to fluid connections and more particularly to improvements in methods and assemblies for making fluid connections between a conduit and a fluid connector by piercing the conduit.

DESCRIPTION OF THE PRIOR ART

Most fluid systems such as systems for the flow of water or other liquids require connections to be made to fluid conduits. Many different types of connectors have been used to make these connections.

Some liquid delivery systems use plastic tubes or pipes because of advantages including low cost, light weight and ease of handling. For example, plastic pipes are used for poultry watering systems where water is delivered under pressure to a large number of locations such as cages containing birds requiring access to drinking water. A poultry watering valve is installed at each different location. A fluid system of this type requires that a large number of connections be made along the flow path.

In the past, such connections have been made by attaching a valve or a connector and valve to the wall of the pipe at each of the many locations. A conventional way to make such a connection includes the steps of drilling a hole in the wall of the pipe, cleaning the area around the hole, applying a solvent to the pipe and to a connector such as a valve housing or saddle member and mounting the connector onto the pipe so that fluid communication is established and so that the solvent causes a fluid tight seal.

This conventional method has serious disadvantages. Watering valves or other system components can be fouled by debris in the system. Although plastic pipe is supplied in a clean and debris free condition, when the pipe is drilled the resulting fragments and swarf can cause fouling. Thus, the pipe must be cleaned after drilling. Another disadvantage is the large number of separate operations that must be performed when each connection is made. A further disadvantage is the necessity for using a solvent because such materials are volatile and environmentally undesirable, requiring special provisions for storage, handling, ventilation and the like.

Problems with the conventional method provide an incentive for seeking ways to make the fluid connections without drilling the pipe, without using solvents and without a large number of assembly steps. Fluid connections have been made in the past with methods in which a conduit wall is pierced, but known methods have not been suitable.

U.S. Pat. No. 2,660,192 discloses a saddle valve that is attached to a pipe with the valve member in a retracted position. Then the valve is manually turned to a closed position and a penetrating tool formed as a permanent part of the valve member pierces the wall of the pipe. This approach requires a strong valve member and a large mechanical advantage in the valve operating mechanism for forcing the tool through the wall. In addition, axial flow through the penetrating portion is not possible because if the tool were hollow, it would not have the required strength.

U.S. Pat. No. 3,891,150 discloses a drip irrigation device that is installed onto a pipe. The device includes a stinger 24 and hollow cannula of "stainless steel, reinforced nylon or any other appropriate material". The cannula is forced through the wall of the pipe to establish the fluid connection. One problem with this approach is that the end of the cannula is unobstructed during the piercing operation and can become blocked either by deformation or by pipe wall material. Another problem is that the cannula is weak because it is hollow. If a stainless steel cannula is used to pierce a polyethylene pipe as preferred, this may not be a problem. However, if the material of the cannula is similar in strength to the material of the pipe, the cannula could not pierce the pipe or would be damaged during piercing.

SUMMARY OF THE INVENTION

Among the objects of the present invention are to provide a method for making fluid connections to a conduit without drilling or causing debris; to provide a method for making a fluid connection to plastic pipe without the use of solvents; to provide a method that is performed in few steps; to provide a method for connecting a connector to a conduit by piercing in which the material of the connector need not be substantially stronger than the material of the pipe; to provide a fluid connection assembly in which a one-piece connector is employed without drilling or solvents; and to provide a method and assembly that overcomes disadvantages with methods and assemblies used in the past.

In brief, the objects and advantages of the invention are achieved by providing a method for making a fluid connection between a conduit having a wall and a fluid connector having a hollow nose. The fluid connector is mounted on a tool having a punch pin extending through and beyond the hollow nose. The tool is moved toward the conduit to force the punch pin through the conduit wall and make a hole in the wall. The tool is advanced further toward the conduit to force the hollow nose through the conduit wall to enlarge the hole in the wall while inserting the nose portion into the interior of the conduit. While the nose is advanced through the wall, it is supported by the punch pin. The tool is retracted away from the conduit to withdraw the punch pin from the fluid connector in order to leave the connector in place on the conduit with the nose portion extending through the enlarged hole.

In brief, a fluid connection assembly in accordance with the present invention includes a conduit having a wall and a connector having a body portion and a hollow nose portion extending from the body portion. The hollow nose portion and the body portion are integral and of one piece. The body portion is adjacent the conduit wall and the nose portion extends through the wall. The wall has a deformed region defining an opening in the wall receiving the nose portion. The deformed region includes displaced wall material defining a collar surrounding the nose portion for an axial distance greater than the thickness of the wall. A resilient seal interface between the collar and the nose portion is defined by hoop compression against the nose portion and complementary hoop expansion against the collar.

BRIEF DESCRIPTION OF THE DRAWINGS

The present invention together with the above and other objects and advantages may best be understood from the following detailed description of the embodiment of the invention illustrated in the drawings, wherein:

FIG. 1 is a side elevational view of a segment of plastic pipe on which a fluid connector is mounted in accordance with the present invention;

FIG. 2 is an enlarged sectional view of the pipe and connector taken along the line 2—2 of FIG. 1;

FIGS. 3-6 are similar sequential views showing the installation of the connector onto the pipe; and FIG. 7 is a greatly enlarged, fragmentary sectional view of portions of the pipe and connector during the method of the present invention.

DETAILED DESCRIPTION OF THE PREFERRED EMBODIMENT

Referring now to the drawings, FIGS. 1 and 2 illustrate one application for the method and assembly of the present invention. A poultry watering valve 10 is mounted on a pipe 12 using the method of the invention. Valve 10 includes a body 14 that, in this illustration of the invention, serves as a fluid connector for establishing fluid communication with the interior of the pipe 12. The principles of this invention can be employed in many other ways and in other types of fluid and liquid systems. Fluid connectors differing in function and structure from the body 14 may be used.

My U.S. Pat. No. 4,896,629, dated Jan. 30, 1990 (Ser. No. 07/238,538, filed Aug. 30, 1988) is incorporated here by reference and may be consulted for a description of the valve 10 beyond that required for an understanding of the present invention. Valve 10 includes a valve seat 16 defined within body 14 between an inlet bore 18 and a cavity 20. The cavity is defined under a cap 22 and contains a spring 24 and portions of a seal member 26. An operating stem 28 moves the seal member 26 to open the valve for flow from the pipe 12 through the bore 18 to an outlet 30. The seal member 26 includes a restrictor pin 32 extending through the bore 18 and into the interior of the pipe 12 with a clearance selected to provide a restricted and regulated flow. The seal member 26 is made of a flexible, soft and resilient material.

In a typical poultry watering system there are many valves 10 installed along a system having numerous pipes 12. The pipes are supplied in standard lengths that do not match the distances between the valves. Thus the valves must be installed between the ends of lengths of the pipes 12 and fluid connections must be made through the wall 34 of the pipe. The method of the present invention makes it possible to make the connections quickly and cleanly.

Body or connector 14 includes a main body portion 36 from which projects a slender, elongated nose portion 38. The nose portion is hollow so that after the fluid connection is made, fluid can flow from the interior of the pipe 12 and through the connector 14. In the illustrated arrangement, the valve inlet bore 18 is defined within and along the axis of the nose 38.

The method of the present invention is partially illustrated in FIGS. 3-6. The connector 14 is mounted on an installation tool 40 carried on a ram 42 of a press or similar mechanism. Pipe 14 is supported on a base 44 of the press between side supports 46 with a selected point on the pipe wall 34 aligned with the tool 40. Tool 40 includes a punch pin 48 that extends through the nose portion 38 and beyond its tip. Punch pin 48 is received closely within the bore 18. Tool 40 also includes an enlarged step 50 that abuts against an inner flange surface 52 of the connector 14 with a driving engagement (FIG. 7).

When the pipe 12 and connector 14 are positioned on the ram 42 and base 44 as seen in FIG. 3, the press is moved toward the closed position. As seen in FIGS. 4 and 5, the punch pin 48 firsts contacts and then pierces a hole through the pipe wall 34. The punch pin 48 includes a point 54 having a pyramid shape made up of a series of flat, sloped walls 56 intersecting at sharp corners 58. The pointed shape facilitates movement of the punch pin 48 through the material of wall 34 and the corners 58 tend to cut entry lines through the material extending outward from a central point to prevent material from being dislodged.

Tool 40 continues to move to the closed position. The punch pin moves farther through the tube wall until the tip of the nose portion 38 reaches the wall 34. This position is seen in FIG. 5. The tip has a bevelled surface 60. As the tool 40 moves toward the position seen in FIG. 6, the nose portion is forced through the hole in the wall 34. The bevelled surface 60 and any draft of the nose portion 38 further enlarges the hole. After the tool 40 moves fully to the closed position seen in FIGS. 6 and 7, the tool is retracted and the connector 14 is left in place with the nose portion extending into the interior of the pipe 14.

As the wall 34 is pierced, no material is dislodged. The pyramid shaped point 54 assures that the punch pin does not sever material from the wall 34. The cuts started by the sharp corners 58 are extended as the nose portion 38 enlarges the hole. The material of the wall 34 is deformed inwardly to make a collar 62 that defines the hole and that embraces the nose portion 38. During this deformation, the wall material is segmented or partially peeled inwardly in a series of discrete petal-like segments 64 that are firmly attached to the wall 34 at their bases.

The punch pin 48 supports and reinforces the relatively thin wall of the hollow nose portion 38 as the nose portion is pushed through the wall 34. If the punch pin were not used to make the hole initially, the nose portion could not be forced through the wall 34. If the punch pin 48 did not support the nose portion, the nose portion would not have sufficient strength alone to enlarge the hole without becoming deformed. Any such deformation would interfere with the desired operation of the valve 10 because the relative fit of the restrictor pin 32 in the bore 18 is important for regulating flow through the valve.

At the interface of the collar 62 with the nose portion 38, a fluid tight seal is created without the use of solvents, sealing material or the like. The contact with the collar extends in the direction of the axis of the nose portion for a distance greater than the thickness of wall 34 and provides an extensive sealing area. The tight fit between the nose portion and the collar 62 assures a good seal. The sealing interface is maintained by the resilient properties of the nose portion 38 and the wall 34. After the wall 34 is pierced, the material of the collar 62 has a tendency to return to its original shape and this results in a squeezing or hoop compression against the nose portion 38. In a complementary action, the compressed nose portion 38 tends to expand out against the collar 62 with a hoop expansion effect.

The tight fit between the nose portion 38 and the collar 62 provides a frictional force that resists removal of the nose portion from the pipe 12, and this force may be sufficient in some circumstances to maintain the parts in assembly. In the embodiment illustrated in the drawings, the frictional holding force is augmented by providing a pair of resilient arms 66 on the connector 14. These arms function as a saddle to grip the pipe 12 and hold the connector 14 in its installed position. As seen in FIGS. 3-6, the arms 66 are flexed apart by engagement with the wall 34 as the tool 40 moves toward the closed position. Then the arms close around the pipe 14 and retain the connector against the pipe as the tool 40 is retracted. Subsequently, the connector 14 is held in firmly in place so that leaks do not result as the watering system including the valve 10 is installed and used.

In the illustrated embodiment of the invention, the pipe 12 is made of polyvinyl chloride and the connector 14 is made of acetal resin. These materials are generally similar to one another in characteristics such as strength, ductility and flexibility. Using the method of the present invention, it is not necessary that the material of the nose portion 38 be much harder or much stronger than the material of the pipe 12. An important advantage resulting from this feature of the invention is that the entire connector is made of a homogeneous, uniform material as an integral, one-piece part. The invention may be employed with other materials such as pipe of ABS, polypropylene or the like, or even a ductile metal if a corresponding material is employed for the connector 14.

While the invention has been described with reference to details of the illustrated embodiment, these details are not intended to limit the scope of the invention as defined in the following claims.

I claim:

1. A method for assembling a fluid connection between a conduit having a wall and a fluid connector having a smoothly tapered hollow nose without threads, said method comprising the steps of:
   mounting the fluid connector on a tool having a punch pin with a sharp, pointed tip extending through and beyond the hollow nose;
   moving the tool in a first increment of movement toward the conduit to pierce the conduit wall with the pointed tip of the tool and force the punch pin through the conduit wall in order to make a hole in the wall without dislodging material from the wall;
   advancing the tool in a second increment of movement toward the conduit to push the hollow nose through the conduit wall with a force imparted substantially only by the tool in order to enlarge the hole in the wall while inserting the nose into the interior of the conduit and to form a seal between the nose portion and the enlarged hole;
   supporting the interior of the nose with the punch pin during said advancing step; and;
   retracting the tool away from the conduit to withdraw the punch pin from the fluid connector in order to leave the connector in place on the conduit with the nose extending through the enlarged hole.

2. The method set forth in claim 1 further comprising segmenting the conduit wall in discrete portions with pyramidal faces of the pointed tip.

3. The method set forth in claim 1 further comprising holding the fluid connector during said retracting step.

4. The method set forth in claim 3, said holding step comprising retaining the fluid connector on the conduit wall.

5. The method set forth in claim 4, said retaining step comprising grasping the conduit with flexible arms of the fluid connector.

6. A method for assembling a fluid-tight attachment between a plastic pipe having a wall and a plastic connector having a smoothly tapered hollow nose without threads, said method comprising the steps of:
   mounting the connector on a tool having a punch pin with a sharp pointed tip extending through and beyond the hollow nose;
   moving the tool in a first increment of movement toward the pipe to pierce the wall of the pipe with the pointed tip of the tool and force the punch pin through the wall in order to make a hole in the wall without dislodging material from the wall;
   advancing the tool in a second increment of movement toward the pipe to push the hollow nose through the wall with a force imparted substantially only by the tool in order to enlarge the hole in the wall while inserting the nose into the interior of the pipe and to form a seal between the nose portion and the enlarged hole;
   supporting the interior of the nose with the punch pin during said advancing step; and;
   retracting the tool away from the pipe to withdraw the punch pin from the connector in order to leave the connector in place on the pipe with the nose extending through the enlarged hole.

7. A fluid connection assembly comprising
   a conduit having a wall portion with an aperture formed therein;
   a connector having a body portion and a hollow nose portion extending from the body portion, said hollow nose portion and said body portion being integral and of one piece;
   said nose portion being smooth and tapered and unthreaded;
   said body portion being adjacent said conduit wall portion and said nose portion being forced through said wall aperture;
   said wall aperture having a deformed region defining an enlarged opening in said wall aperture after said nose portion has been received within said aperture;
   said deformed region including wall material being displaced radially inwardly into the conduit and defining a collar surrounding said nose portion for an axial distance greater than the thickness of said wall; and
   a resilient seal interface being formed between said collar and said nose portion defined by hoop compression of said nose portion and complementary hoop expansion of said collar.

8. The assembly of claim 7, said conduit and said connector being made of plastic.

9. The assembly of claim 8, said conduit comprising a polyvinyl chloride tube and said connector comprising a part molded of acetal resin.

10. The assembly of claim 9, said body portion including a saddle for grasping said tube.

11. The assembly of claim 7, said connector body portion defining a valve housing, and a valve assembly within said housing for controlling fluid communication with said conduit through said hollow nose portion.

* * * * *